United States Patent
Kim et al.

(10) Patent No.: US 9,210,736 B2
(45) Date of Patent: Dec. 8, 2015

(54) METHOD FOR TRANSCEIVING SIGNALS BETWEEN A BASE STATION AND A RELAY NODE IN A WIRELESS COMMUNICATION SYSTEM, AND APPARATUS FOR SAME

(75) Inventors: Hakseong Kim, Anyang-si (KR); Hanbyul Seo, Anyang-si (KR); Byounghoon Kim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 13/642,841

(22) PCT Filed: Apr. 20, 2011

(86) PCT No.: PCT/KR2011/002851
§ 371 (c)(1),
(2), (4) Date: Oct. 22, 2012

(87) PCT Pub. No.: WO2011/132946
PCT Pub. Date: Oct. 27, 2011

(65) Prior Publication Data
US 2013/0044712 A1    Feb. 21, 2013

Related U.S. Application Data

(60) Provisional application No. 61/327,085, filed on Apr. 22, 2010, provisional application No. 61/330,898, filed on May 4, 2010, provisional application No. 61/333,212, filed on May 10, 2010, provisional application No. 61/334,188, filed on May 13, 2010.

(51) Int. Cl.
*H04W 72/04*    (2009.01)
*H04W 92/04*    (2009.01)
(Continued)

(52) U.S. Cl.
CPC ............. *H04W 92/04* (2013.01); *H04L 5/0053* (2013.01); *H04L 5/0094* (2013.01);
(Continued)

(58) Field of Classification Search
CPC ... H04L 5/0053; H04L 5/0007; H04L 5/0032; H04W 84/0047
USPC ........... 370/329, 279, 478, 330, 315; 455/445
See application file for complete search history.

(56) References Cited

U.S. PATENT DOCUMENTS 6,898,743 B2 *    5/2005    Yoon et al. ..................... 714/701
8,385,268 B2 *    2/2013    Chen et al. ..................... 370/328
(Continued)

OTHER PUBLICATIONS

In the PCT International Search Report Application No. PCT/KR2011/002851, dated Jan. 2, 2012, 11 pages.

*Primary Examiner* — Parth Patel
(74) *Attorney, Agent, or Firm* — Lee, Hong, Degerman, Kang & Waimey

(57) ABSTRACT

The present application relates to a method in which a relay node receives control signals from a base station in a wireless communication system. More particularly, the method comprises: a step of receiving, from the base station, a relay-node-dedicated physical downlink control channel (R-PDCCH) via a specific subframe; and a step of performing a blind decoding process on the physical downlink control channel to detect control information for the relay node, wherein said specific subframe includes a first slot and a second slot, and the size of a relay-node-dedicated control channel element (R-CCE) for performing the blind decoding process is individually defined depending on the number of reference signals contained in the first slot and in the second slot.

3 Claims, 21 Drawing Sheets

(51) Int. Cl.
 *H04L 5/00* (2006.01)
 *H04W 28/06* (2009.01)
 *H04W 84/04* (2009.01)
 *H04W 88/08* (2009.01)

(52) U.S. Cl.
 CPC ............ *H04L 5/0007* (2013.01); *H04L 5/0032* (2013.01); *H04W 28/06* (2013.01); *H04W 72/042* (2013.01); *H04W 84/047* (2013.01); *H04W 88/08* (2013.01)

(56) References Cited

U.S. PATENT DOCUMENTS

| | | | | |
|---|---|---|---|---|
| 8,483,620 | B2* | 7/2013 | Horn et al. | 455/67.13 |
| 8,619,687 | B2* | 12/2013 | Choudhury et al. | 370/329 |
| 8,619,719 | B2* | 12/2013 | Wengerter et al. | 370/335 |
| 8,831,042 | B2* | 9/2014 | Kim et al. | 370/491 |
| 2005/0289256 | A1* | 12/2005 | Cudak et al. | 710/62 |
| 2008/0305745 | A1* | 12/2008 | Zhang et al. | 455/67.11 |
| 2009/0088148 | A1* | 4/2009 | Chung et al. | 455/423 |
| 2009/0161618 | A1* | 6/2009 | Johansson et al. | 370/329 |
| 2009/0207793 | A1* | 8/2009 | Shen et al. | 370/329 |
| 2009/0307554 | A1* | 12/2009 | Marinier et al. | 714/748 |
| 2010/0034135 | A1 | 2/2010 | Kim et al. | |
| 2010/0061345 | A1* | 3/2010 | Wengerter et al. | 370/335 |
| 2010/0080139 | A1 | 4/2010 | Palanki et al. | |
| 2010/0118719 | A1* | 5/2010 | Ishii et al. | 370/252 |
| 2010/0118995 | A1* | 5/2010 | Fukui | 375/260 |
| 2010/0246721 | A1* | 9/2010 | Chen et al. | 375/316 |
| 2010/0279628 | A1* | 11/2010 | Love et al. | 455/70 |
| 2010/0281323 | A1* | 11/2010 | Wang et al. | 714/748 |
| 2010/0290418 | A1* | 11/2010 | Nishio et al. | 370/329 |
| 2011/0032884 | A1* | 2/2011 | Yu et al. | 370/329 |
| 2011/0103292 | A1* | 5/2011 | Pasad et al. | 370/315 |
| 2011/0103338 | A1* | 5/2011 | Astely et al. | 370/329 |
| 2011/0170458 | A1* | 7/2011 | Chen et al. | 370/279 |
| 2011/0199985 | A1* | 8/2011 | Cai et al. | 370/329 |
| 2011/0211595 | A1* | 9/2011 | Geirhofer et al. | 370/478 |
| 2011/0228724 | A1* | 9/2011 | Gaal et al. | 370/328 |
| 2011/0243059 | A1* | 10/2011 | Liu et al. | 370/315 |
| 2011/0249640 | A1* | 10/2011 | Soong et al. | 370/329 |
| 2011/0249647 | A1* | 10/2011 | Chen et al. | 370/330 |
| 2012/0015661 | A1* | 1/2012 | Awad | 455/445 |
| 2012/0046066 | A1* | 2/2012 | Tamura et al. | 455/525 |
| 2012/0155414 | A1* | 6/2012 | Noh et al. | 370/329 |
| 2012/0178360 | A1* | 7/2012 | Park et al. | 455/7 |
| 2013/0242854 | A1* | 9/2013 | Cai et al. | 370/315 |
| 2013/0265934 | A1* | 10/2013 | Zeng et al. | 370/315 |

\* cited by examiner (a) CONTROL-PLANE PROTOCOL STACK (b) USER-PLANE PROTOCOL STACK (a) 1TX OR 2TX (b) 4 TX

R-PDCCH

METHOD FOR TRANSCEIVING SIGNALS BETWEEN A BASE STATION AND A RELAY NODE IN A WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2011/002851, filed on Apr. 20, 2011, which claims the benefit of U.S. Provisional Application Ser. No. 61/327,085 filed on Apr. 22, 2010, U.S. Provisional Application Ser. No. 61/330,898 filed on May 4, 2010, U.S. Provisional Application Ser. No. 61/333,212 filed on May 10, 2010, and U.S. Provisional Application Ser. No. 61/334,188 filed on May 13, 2010, the contents of which are all hereby incorporated by reference herein in their entirety.

TECHNICAL FIELD

The present invention relates to a wireless communication system, and more particularly, to a method and apparatus for transmitting and receiving a signal between a Base Station (BS) and a Relay Node (RN) in a wireless communication system.

BACKGROUND ART

A brief description will be given of a $3^{rd}$ Generation Partnership Project (3GPP) Long Term Evolution (LTE) system as an example of a wireless communication system to which the present invention can be applied.

FIG. 1 illustrates the configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to "$3^{rd}$ Generation Partnership Project; Technical Specification Group Radio Access Network" Release 7 and Release 8, respectively.

Referring to FIG. 1, the E-UMTS system includes a User Equipment (UE) 120, evolved Node Bs (eNode Bs or eNBs) 110a and 110b, and an Access Gateway (AG) which is located at an end of an Evolved UMTS Terrestrial Radio Access Network (E-UTRAN) and connected to an external network. The eNBs may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectations of users and service providers are on the increase. Considering other radio access technologies under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the conventional problem is to provide a method and apparatus for transmitting and receiving a signal between a base station and a relay node in a wireless communication system.

Technical Solution

In an aspect of the present invention, a method for receiving a control signal from a Base Station (BS) at a Relay Node (RN) in a wireless communication system includes receiving a Relay-Physical Downlink Control CHannel (R-PDCCH) in a specific subframe from the BS, and detecting control information for the RN by blind decoding of the R-PDCCH. The specific subframe includes a first slot and a second slot and Relay-Control Channel Element (R-CCE) size for the blind decoding is determined individually according to a number of Reference Signals (RSs) included in the first and the second slot.

The number of RSs may be different for the first and the second slot and different R-CCE size may be defined for the first and the second slot.

The same R-CCE size is defined for the first and the second slot and a plurality of R-CCEs may be defined for the second slot.

In another aspect of the present invention, a method for receiving a Relay-Physical Downlink Shared Channel (R-PDSCH) from a BS at a first RN in a wireless communication system includes receiving resource allocation information from the BS, the resource allocation information indicating a search space in units of a Resource Block (RB) for an R-PDCCH dedicated to the first RN, and receiving the R-PDSCH in a specific subframe from the BS based on the resource allocation information. The R-PDSCH is received in RBs to which the search space for the R-PDCCH is allocated, only in a second slot of the specific subframe.

The resource allocation information may include information indicating a search space for a second R-PDCCH dedicated to one or more RNs, and the R-PDSCH may be received in RBs to which the search space for the second R-PDCCH dedicated to one or more RNs is allocated, only in the second slot of the specific subframe.

In another aspect of the present invention, a method for transmitting an R-PDCCH to an RN at a BS in a wireless communication system includes calculating a bandwidth in which a plurality of R-PDCCHs are to be transmitted, setting a smallest of multiples of a basic interleaving size including the calculated bandwidth as an interleaving unit size, allocating transmission resources by interleaving the plurality of R-PDCCHs according to the interleaving unit size, and transmitting the interleaved R-PDCCHs to the RN using the allocated transmission resources.

The basic interleaving unit size may be a size of a Resource Block Group (RBG) expressed in units of an RB.

In a further aspect of the present invention, a method for receiving control information from a BS at an RN in a wireless communication system includes receiving a downlink signal from the BS, receiving an offset for blind decoding from the BS, and detecting control information for the RN by blind decoding of a search space indicated by the downlink signal. A starting point of blind decoding in the search space is determined by the offset. The downlink signal may be interleaved control information for a plurality of RNs.

Advantageous Effects

According to the embodiments of the present invention, a base station and a relay node can transmit and receive signals efficiently in a wireless communication system including relay nodes.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

The configuration, operation, and other features of the present invention will readily be understood with embodiments of the present invention described with reference to the attached drawings. Embodiments of the present invention as set forth herein are examples in which the technical features of the present invention are applied to a $3^{rd}$ Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while embodiments of the present invention are described in the context of Frequency Division Duplex (FDD), this is purely exemplary. Therefore, the embodiments of the present invention are applicable to Half-FDD (H-FDD) or Time Division Duplex (TDD) with some modifications made to them.

Figure 1:
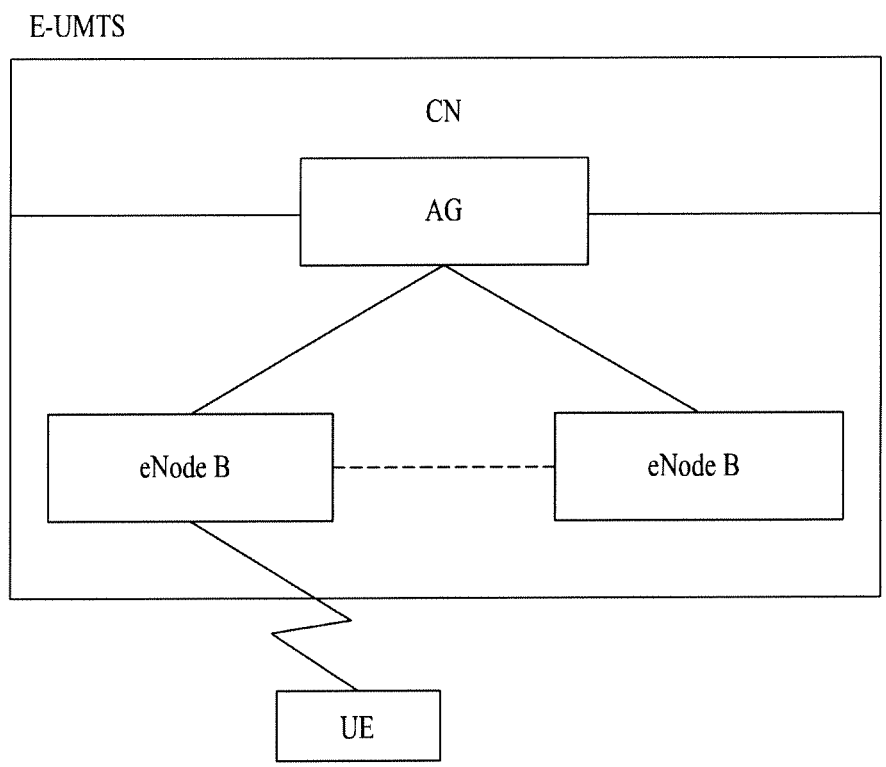
FIG. 1 illustrates the configuration of an Evolved Universal Mobile Telecommunications System (E-UMTS) network as an example of a wireless communication system.
Figure 2:
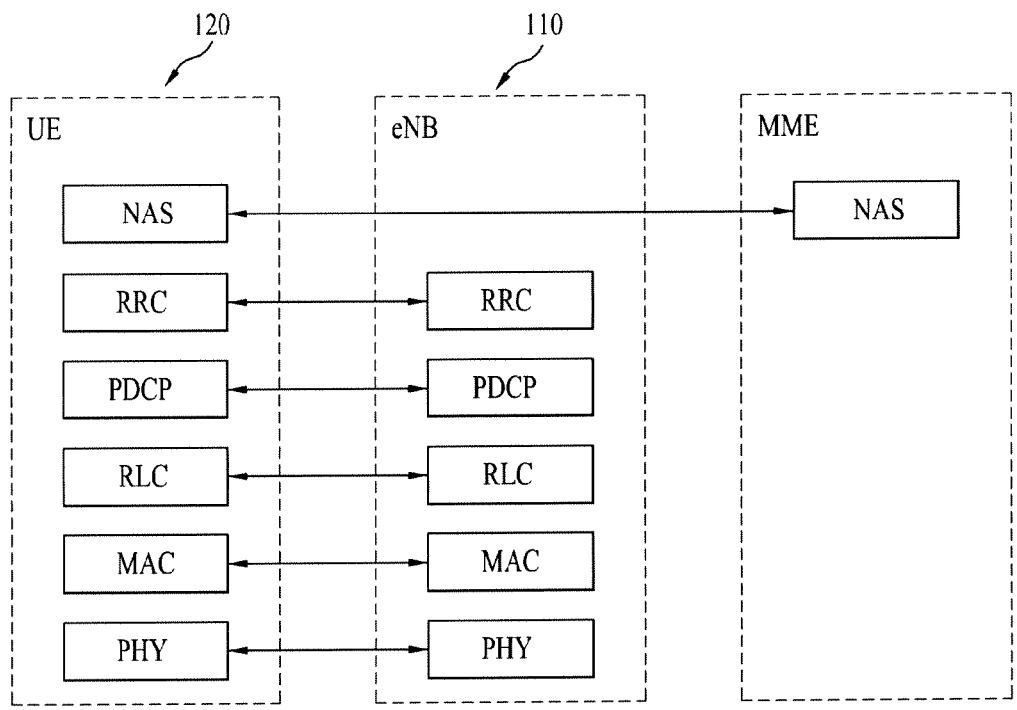
FIG. 2 illustrates a control-plane protocol stack and a user-plane protocol stack in a radio interface protocol architecture conforming to a $3^{rd}$ Generation Partnership Project (3GPP) radio access network standard between a User Equipment (UE) and the E-UTRAN.
Figure 2:
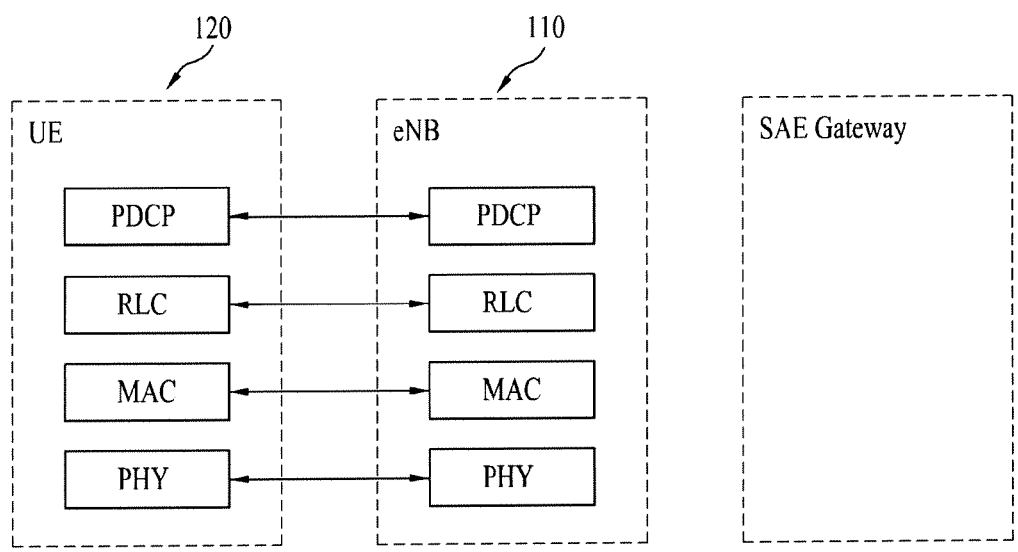

FIG. 2 illustrates control-plane and user-plane protocol stacks in a radio interface protocol architecture conforming to a 3GPP wireless access network standard between a UE and an E-UTRAN. The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, the Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between a UE and the E-UTRAN, the UE is in RRC Connected mode and otherwise, the UE is in RRC Idle mode. A Non-Access Stratum (NAS) layer above the RRC layer performs functions including session management and mobility management.

A cell covered by an eNB is set to one of the bandwidths of 1.25, 2.5, 5, 10, 15, and 20 MHz and provides downlink or uplink transmission service to a plurality of UEs in the bandwidth. Different cells may be set to different bandwidths.

Downlink transport channels used to deliver data from the E-UTRAN to UEs include a Broadcast CHannel (BCH) carrying system information, a Paging CHannel (PCH) carrying a paging message, and a Shared CHannel (SCH) carrying user traffic or a control message. Downlink multicast traffic or control messages or downlink broadcast traffic or control messages may be transmitted on a downlink SCH or a separately defined downlink Multicast CHannel (MCH). Uplink transport channels used to deliver data from a UE to the E-UTRAN include a Random Access CHannel (RACH) carrying an initial control message and an uplink SCH carrying user traffic or a control message. Logical channels that are defined above transport channels and mapped to the transport channels include a Broadcast Control CHannel (BCCH), a Paging Control CHannel (PCCH), a Common Control CHannel (CCCH), a Multicast Control CHannel (MCCH), and a Multicast Traffic CHannel (MTCH).

Figure 3:
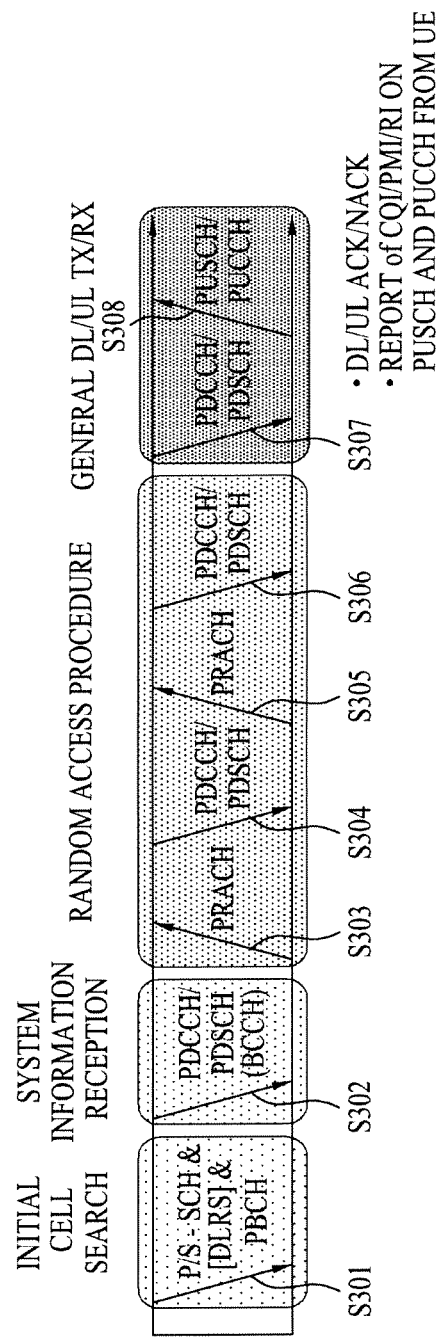
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization CHannel (P-SCH) and a Secondary Synchronization CHannel (S-SCH) from the eNB. Then the UE may acquire information broadcast in the cell by receiving a Physical Broadcast CHannel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control CHannel (PDCCH) and receiving a Physical Downlink Shared CHannel (PDSCH) based on information included in the PDCCH (S302).

If the UE initially accesses the eNB or has no radio resource for signal transmission, the UE may perform a random access procedure with the eNB (S303 to S306). In the random access procedure, the UE may transmit a predetermined sequence as a preamble on a Physical Random Access CHannel (PRACH) (S303 and S305) and receive a response message to the preamble on a PDCCH and a PDSCH associated with the PDCCH (S304 and S306). In case of a contention-based RACH, the UE may additionally perform a contention resolution procedure.

After the above procedure, the UE may receive a PDCCH and/or a PDSCH from the eNB (S307) and transmit a Physical Uplink Shared CHannel (PUSCH) and/or a Physical Uplink Control CHannel (PUCCH) to the eNB (S308), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
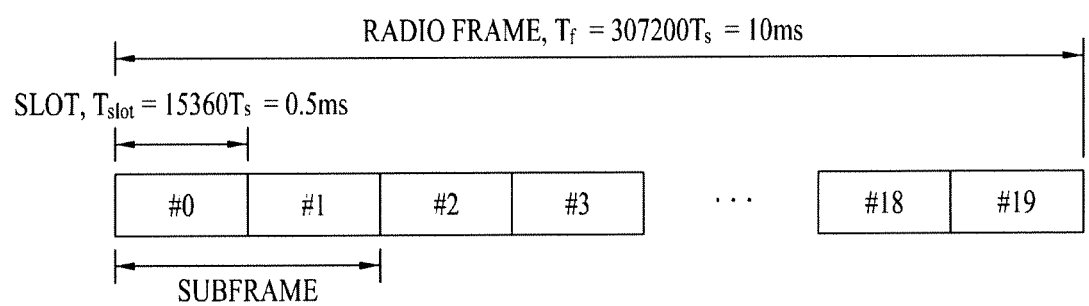
FIG. 4 illustrates the structure of a radio frame in a Long Term Evolution (LTE) system.

FIG. 4 illustrates the structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of OFDM symbols or SC-FDMA symbols in the time domain and a plurality of Resource Blocks (RBs) in the frequency domain. In the LTE system, one RB includes 12 subcarriers by 7 (or 6) OFDM symbols. A unit time in which data is transmitted is defined as Transmission Time Interval (TTI). The TTI may be defined as one or more subframes. The above-described radio frame structure is purely exemplary and thus the number of subframes in a radio frame, the number of slots in a subframe, or the number of OFDM symbols in a slot may vary.

Figure 5:
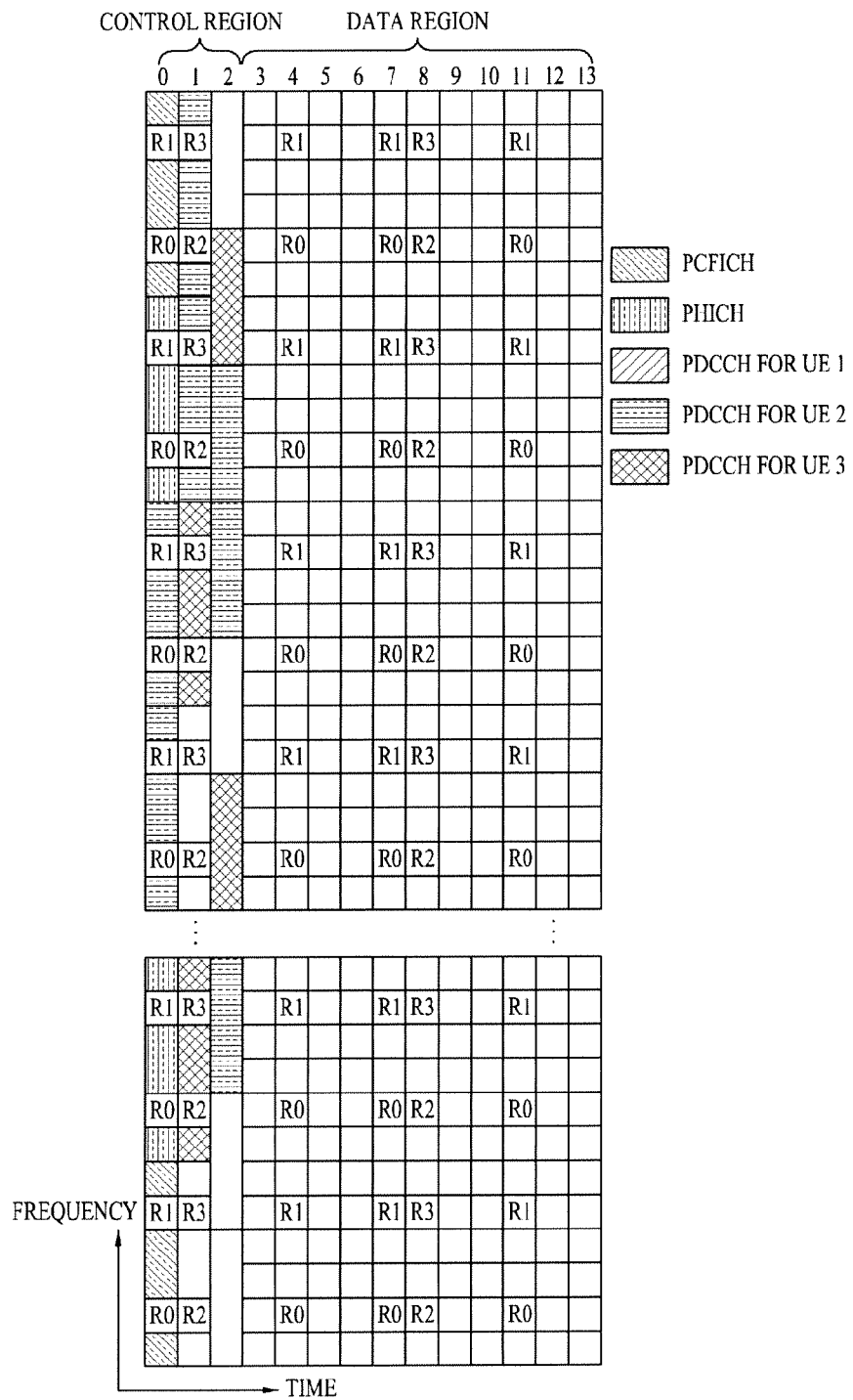
FIG. 5 illustrates the structure of a downlink subframe in the LTE system.

FIG. 5 illustrates an exemplary control channel included in the control region of a subframe in a downlink radio frame.

Referring to FIG. 5, a subframe includes 14 OFDM symbols. The starting one to three OFDM symbols are used for a control region and the other 13 to 11 OFDM symbols are used for a data region according to a subframe setting. In FIG. 5, reference characters R1 to R4 denote RSs or pilot signals for antenna 0 to antenna 3. RSs are allocated in a predetermined pattern in a subframe in the control region and the data region. A control channel is allocated to non-RS resources in the control region and a traffic channel is also allocated to non-RS resources in the data region. Control channels allocated to the control region include a Physical Control Format Indicator CHannel (PCFICH), a Physical Hybrid-ARQ Indicator CHannel (PHICH), a Physical Downlink Control CHannel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed based on a cell Identity (ID) in a control region. One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the starting n OFDM symbols of a subframe. Herein, n is 1 or a larger integer indicated by the PCFICH. The PDCCH is composed of one or more CCEs. The PDCCH carries resource allocation information about transport channels, a PCH and a DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are carried on a PDCCH. For example, on the assumption that the CRC of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) is transmitted in a specific subframe, a UE within a cell monitors a PDCCH using its RNTI information. If one or more UEs have RNTI "A", these UEs receive the PDCCH and receives a PDSCH indicated by "B" and "C" based on information of the received PDCCH.

Figure 6:
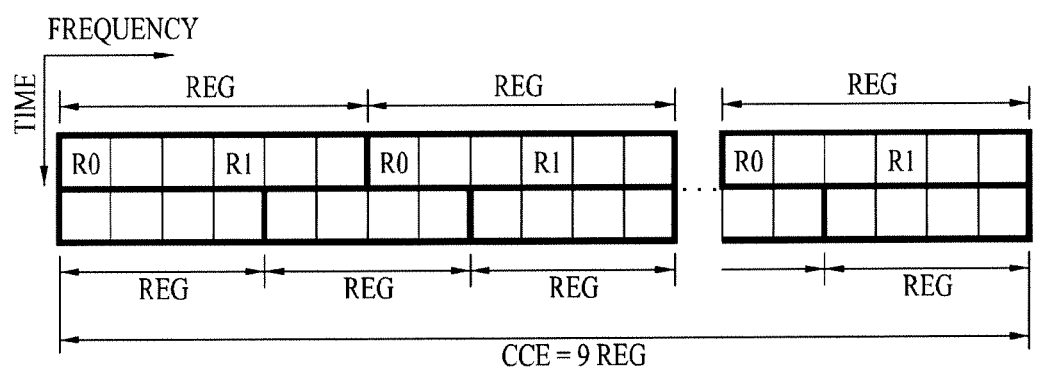
FIG. 6 illustrates a resource unit used for configuring a control channel.
Figure 6:
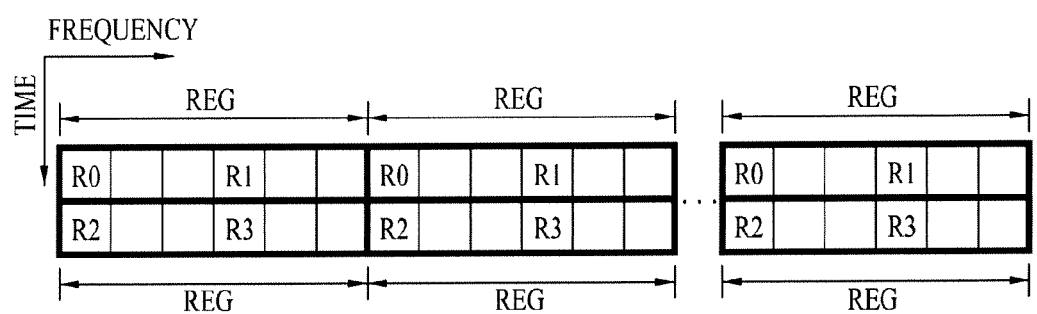

FIG. 6 illustrates a resource unit used for configuring a control channel. Specifically, FIG. 6(a) illustrates a case of 1 or 2 Transmission (Tx) antennas in an eNB and FIG. 6(b) illustrates a case of 4 Tx antennas in an eNB. Resource units are configured for control channels in the same manner, except that an RS pattern is different according to the number of Tx antennas.

Referring to FIG. 6, a basic resource unit for a control channel is an REG. An REG includes 4 adjacent REs, except RSs. REGs are marked by bold lines in FIG. 6. The PCFICH and the PHICH include 4 REGs and 3 REGs, respectively. A PDCCH is configured in units of a Control Channel Element (CCE) and one CCE includes 9 REGs.

To determine whether a PDCCH having L CCEs is directed to a UE, the UE monitors M (L) (≥L) contiguous CCEs or M (L) (≥L) CCEs arranged in a predetermined rule. The UE may consider a plurality of L values, for PDCCH reception. CCE sets that the UE should monitor for PDCCH reception are called a search space. For instance, the LTE system defines search spaces as illustrated in [Table 1].

TABLE 1

| Type | Search space $S_k^{(L)}$ | | Number of PDCCH candidates $M^{(L)}$ | DCI formats |
| --- | --- | --- | --- | --- |
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The CCE aggregation level, L indicates the number of CCEs that form a PDCCH, $S_k^{(L)}$ indicates a search space with CCE aggregation level L, and $M^{(L)}$ indicates the number of PDCCH candidates to be monitored in the search space with aggregation level L.

Search spaces may be categorized into a UE-specific search space accessible to only a specific UE and a common search space accessible to all UEs within a cell. A UE monitors common search spaces with CCE aggregation levels 4 and 8 and UE-specific search spaces with CCE aggregation levels 1, 2, 4 and 8. A common search space may be overlapped with a UE-specific search space.

For each CCE aggregation level, the position of the first CCE (a CCE having the smallest index) in a PDCCH search space allocated to a UE changes for the UE in every subframe. This is called PDCCH search space hashing.

Figure 7:
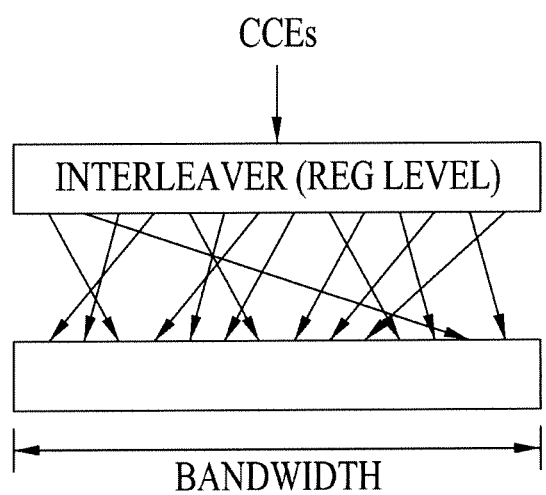
FIG. 7 illustrates an example of distributing Control Channel Elements (CCEs) across a system band.

FIG. 7 illustrates an example of distributing CCEs across a system band. Referring to FIG. 7, logically successive CCEs are input to an interleaver. The interleaver permutes the order of the received CCEs on an REG basis. Therefore, the frequency/time resources of one CCE are physically distributed across a total frequency/time area within the control region of a subframe. As a consequence, even though a control channel is configured with CCEs, interleaving is performed on an REG basis, thereby maximizing diversity and interference randomization gains.

Figure 8:
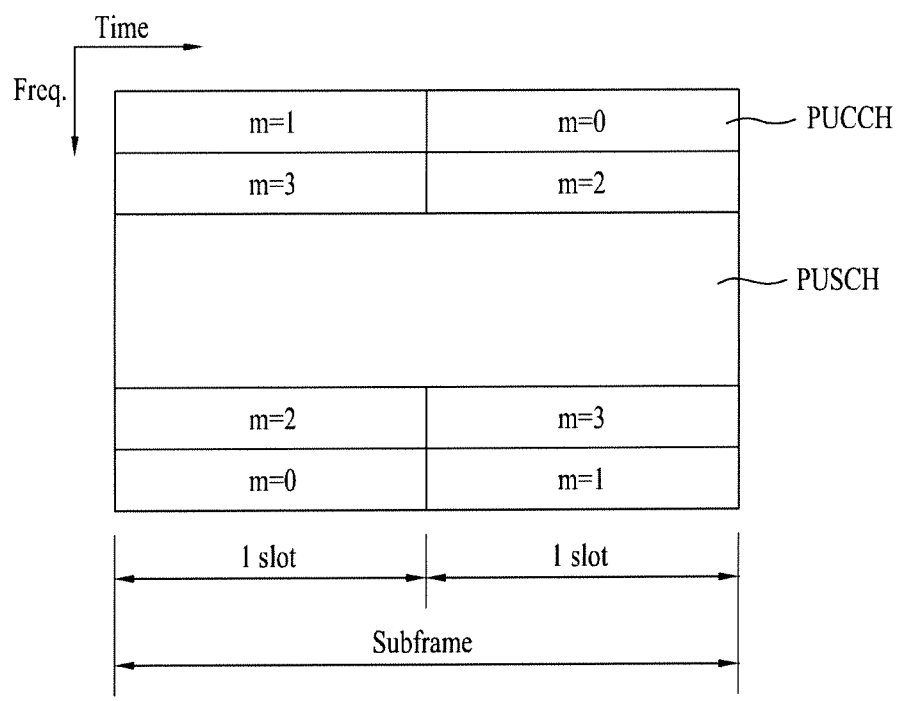
FIG. 8 illustrates the structure of an uplink subframe in the LTE system.

FIG. 8 illustrates the structure of a UL subframe in the LTE system.

Referring to FIG. 8, the UL subframe may be divided into a region to which a Physical Uplink Control CHannel (PUCCH) carrying control information is allocated and a region to which a Physical Uplink Shared CHannel (PUSCH) carrying user data is allocated. The middle of the subframe is allocated to the PUSCH and both ends of a data region in the frequency domain are allocated to the PUCCH. Control information carried on the PUCCH includes an HARQ ACK/NACK, a CQI representing a DL channel state, an RI for Multiple Input Multiple Output (MIMO), a Scheduling Request (SR) being a UL resource allocation request, etc. A PUCCH for a UE uses one RB occupying a different frequency in each slot of a subframe. That is, two RBs allocated to the PUCCH frequency-hop over the slot boundary. Especially, FIG. 7 illustrates allocation of PUCCHs with m=1, 2, and 3 to a subframe.

Meanwhile, when the channel state between an eNB and a UE is poor, a Relay Node (RN) is installed between them to provide a better radio channel to the UE. In addition, use of an RN at a cell area where a channel from an eNB is in poor state can provide a high-speed data channel and extend cell service coverage. RNs have been introduced to eliminate shadowing areas and are widely deployed in a wireless communication system.

Conventionally, relaying was confined to the function of a repeater that simply amplifies a signal and forwards the amplified signal. However, more intelligent relay schemes have recently been developed. Furthermore, relaying is a requisite technology to reduce eNB installation cost and backhaul maintenance cost, while extending service coverage and increasing data throughput in a future-generation mobile communication system. Along with the growth of relaying techniques, there exists a need to support an RN used in a conventional wireless communication system for a new wireless communication system.

In a 3GPP LTE-Advanced (LTE-A) system, with the introduction of a function of relaying a signal on a link between an eNB and a UE to an RN, two links having different attributes apply to each of DL and UL carrier frequency bands. A link between the eNB and the RN is defined as a backhaul link. A backhaul link through which a signal is transmitted using downlink resources in FDD or TDD is called a backhaul downlink, whereas a link through which a signal is transmitted using uplink resources in FDD or TDD is called a backhaul uplink.

Figure 9:
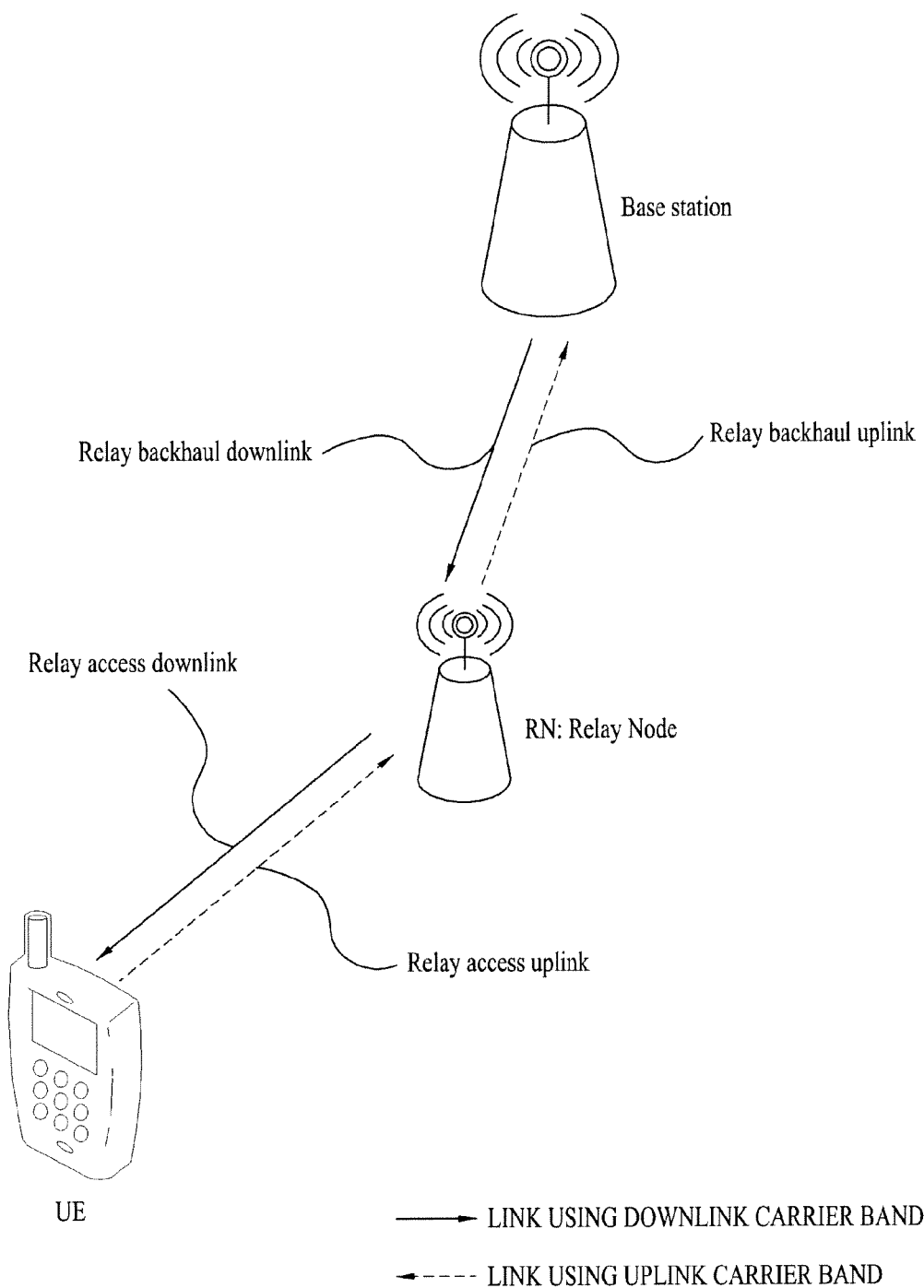
FIG. 9 illustrates the configuration of a relay backhaul link and a relay access link in a wireless communication system.

FIG. 9 illustrates the configuration of a relay backhaul link and a relay access link in a wireless communication system.

Referring to FIG. 9, with the introduction of a function of relaying a signal on a link between an eNB and a UE to an RN, two links having different attributes apply to each of downlink and uplink carrier frequency bands. A link between the eNB and the RN is defined as a backhaul link. A backhaul link through which a signal is transmitted using downlink resources in FDD or TDD is called a backhaul downlink, whereas a link through which a signal is transmitted using uplink resources in FDD or TDD is called a backhaul uplink.

Meanwhile, a link between an RN and a UE is defined as a relay access link. A relay access link through which a signal is transmitted in a downlink frequency band (in case of FDD) or in downlink subframe resources (in case of TDD) is called an access downlink, whereas a relay access link through which a signal is transmitted in an uplink frequency band (in case of FDD) or in uplink subframe resources (in case of TDD) is called an access uplink.

An RN may receive information from an eNB through a relay backhaul downlink and transmit information to the eNB through a relay backhaul uplink. In addition, the RN may transmit information to a UE through a relay access downlink and receive information from the UE through a relay access uplink.

With respect to an RN's usage of a frequency band (or spectrum), its operation can be classified into in-band and out-band. For an in-band RN, a backhaul link shares the same frequency band with an access link. If the backhaul link and the access link operate in different frequency bands, the RN is an out-band RN. In both in-band and out-band relaying, a UE (legacy UE) operating in the conventional LTE system (e.g. Release-8) should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell (even though the other parts of the RRM reside in the RN). Preferably, this RN can support legacy UEs (e.g. LTE UEs). For instance, smart repeaters, decode-and-forward relays, various types of L2 RNs, and type-2 RNs form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a macro eNB. Preferably, a cell controlled by this type of RN may support legacy UEs. For example, RNs of this type include self-backhauling RNs, L3 RNs, type-1 RNs, and type-1a RNs.

A type-1 RN is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channels, RSs, etc. During a single-cell operation, a UE may receive scheduling information and an HARQ feedback directly from the RN and transmit its control channels (an SR, a CQI, an ACK/NACK, etc.) to the RN. The type-1 RN appears as a legacy eNB (operating in conformance to LTE Release-8) to a legacy UE (conforming to LTE Release-8). That is, the type-1 RN has backward compatibility. On the other hand, to LTE-A UEs, the type-1 RN appears different from a legacy eNB. Thus the type-1 RN can enhance performance.

Except for its out-band operation, a type-1a RN is characterized by the same set of features as the type-1 RN. The type-1a RN may be configured such that the influence of its operation on an L1 operation is minimized or eliminated.

A type-2 RN is an in-band RN that does not have its own physical cell ID and thus does not form a new cell. Since the type-2 RN is transparent to legacy UEs, the legacy UEs do not notice the existence of the type-2 RN. The type-2 RN can transmit a PDCCH but does not transmit at least a Common RS (CRS) and a PDCCH.

In order to allow in-band relaying, some resources in the time-frequency domain should be set aside for a backhaul link and these resources may be set not to be used for an access link. This is called resource partitioning.

A description will be given of the general principle of resource partitioning at an RN. A backhaul downlink and an access downlink may be TDM-multiplexed in one carrier frequency (that is, only one of the backhaul downlink and the access downlink is activated at a specific time). Similarly, a backhaul uplink and an access uplink may be TDM-multiplexed in one carrier frequency (that is, only one of the backhaul uplink and the access uplink is activated at a specific time).

Multiplexing of backhaul links in FDD is performed such that backhaul downlink transmission and backhaul uplink transmission take place in a downlink frequency band and an uplink frequency band, respectively. In comparison, multiplexing of backhaul links in TDD is performed such that backhaul downlink transmission and backhaul uplink transmission take place in a downlink subframe between an eNB and an RN and an uplink subframe between the eNB and the RN, respectively.

In case of an in-band RN, for example, if backhaul downlink reception from an eNB and access downlink transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access uplink reception from a UE and backhaul uplink transmission to an eNB take place simultaneously in the same frequency band, the RF front-end of the RN may experience signal interference. Therefore, simultaneous eNB-to-RN and RN-to-UE transmissions in the same frequency band may not be feasible unless a reception signal and a transmission signal are sufficiently isolated from each other (e.g. a Tx antenna is geographically apart enough from an Rx antenna (e.g. on the ground/underground)).

One way to handle the signal interference is to operate the RN such that while the RN is receiving a signal from a donor cell, it is not transmitting signals to UEs. That is, a gap is created in the RN-to-UE transmission and UEs (including legacy UEs) are not supposed to expect any RN transmission during the gap. This gap may be created by configuring a Multicast Broadcast Single Frequency Network (MBSFN) subframe.

Figure 10:
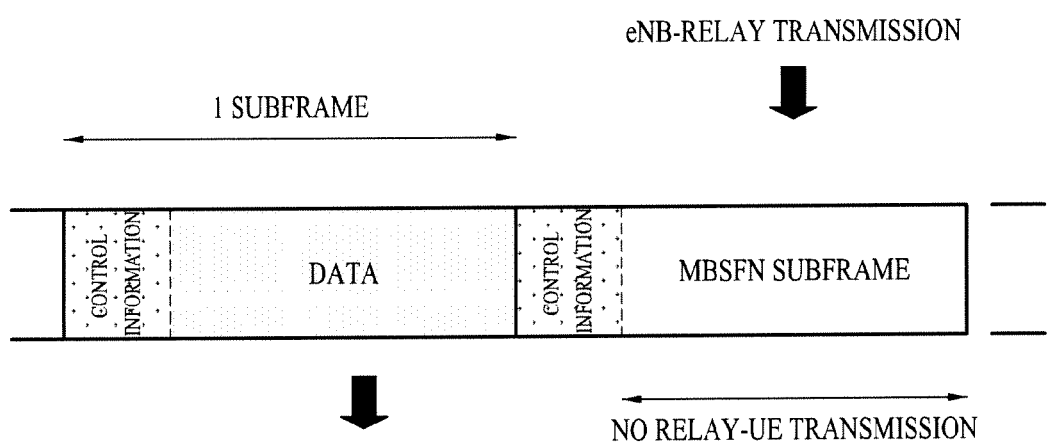
FIG. 10 illustrates an example of relay node resource partitioning.

FIG. 10 illustrates an example of RN resource partitioning.

In FIG. 10, a first subframe is a general subframe in which an RN transmits a downlink (i.e. an access downlink) control signal and data to a UE and a second subframe is an MBSFN subframe in which an RN transmits a control signal to a UE in the control region of a DL subframe but no transmission occurs from an RN to a UE in the other region of the DL subframe. Since a legacy UE expects PDCCH transmission in every DL subframe (in other words, an RN needs to allow legacy UEs within its area to receive a PDCCH in each subframe and thus support a measurement function), it is necessary to transmit a PDCCH in every DL subframe to ensure reliable operations of legacy UEs. Therefore, the RN needs access downlink transmission in the first N (N=1, 2 or 3) OFDM symbols of even a subframe (a second subframe 1020) configured for downlink (i.e. backhaul downlink) transmission from an eNB to the RN, instead of backhaul downlink reception. Since the RN transmits a PDCCH to UEs in the control region of the second subframe, backward compatibility may be provided to legacy UEs served by the RN. The RN may receive a signal from the eNB in the remaining region of the second subframe in which no transmission occurs from the RN to UEs. Thus, an in-band RN does not perform access downlink transmission and backhaul downlink reception simultaneously by the above-described resource partitioning.

The second subframe using an MBSFN subframe will be described in detail. The control region of the second subframe may be referred to as an RN non-hearing period. An RN transmits an access downlink signal without receiving a backhaul downlink signal in the RN non-hearing period. The RN non-hearing period may have 1, 2 or 3 OFDM symbols. The RN may transmit an access downlink signal to a UE in the RN non-hearing period and receive a backhaul downlink signal from an eNB in the other period. Since the RN cannot perform transmission and reception simultaneously in the same frequency band, time is taken for the RN to switch from Tx mode to Reception (Rx) mode. Therefore, a Guard Time (GT) needs to be set in a starting part of the backhaul downlink reception area, for Tx/Rx mode switching of the RN. Similarly, when the RN receives a backhaul downlink signal from the eNB and transmits an access downlink signal to a UE, a GT may be set for Rx/Tx mode switching of the RN. The length of a GT may be a time-domain value, for example, k (k≥1) time samples ($T_s$) or one or more OFDM symbols. Or when RN backhaul downlink subframes are successively configured or according to a predetermined subframe timing alignment relationship, a GT may not be defined or set at the end of a subframe. To maintain backward compatibility, a GT may be defined only in a frequency area set for backhaul downlink subframe transmission (if a GT is set in an access downlink period, legacy UEs cannot be supported). The RN may receive a PDCCH and a PDSCH from the eNB in the backhaul downlink reception period except for the GT. The PDCCH and PDSCH may be called an R-PDCCH and an R-PDSCH to indicate that they are RN dedicated physical channels.

Embodiment 1

Method for Mapping DL Grants and UL Grants

Figure 11:
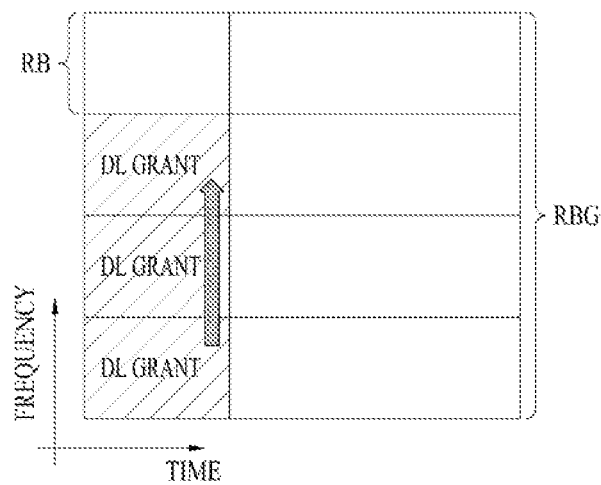
FIG. 11 illustrates a method for mapping downlink grants of a Relay-Physical Downlink Control CHannel (R-PDCCH) according to an embodiment of the present invention.
Figure 12:
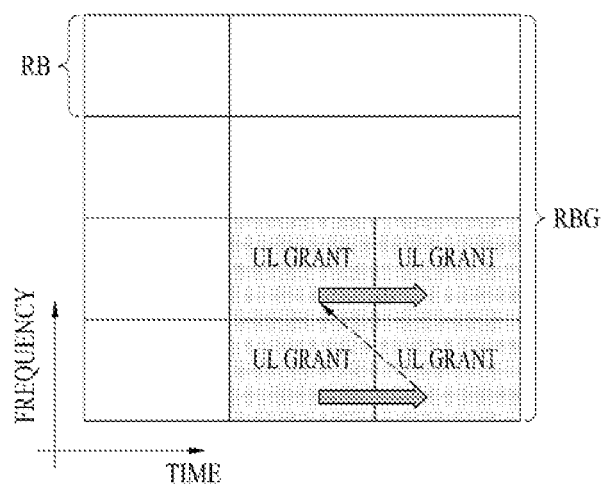
FIG. 12 illustrates a method for mapping uplink grants of an R-PDCCH according to the embodiment of the present invention.

FIG. 11 illustrates a method for mapping DL grants of an R-PDCCH according to an embodiment of the present invention and FIG. 12 illustrates a method for mapping UL grants of an R-PDCCH according to the embodiment of the present invention.

Referring to FIG. 11, in the case where DL grants are mapped to a first slot in a pair of Physical RBs (PRBs) allocated as R-PDCCH resources, that is, in the PRBs comprised of first and second slots, if the number of DL grants increases, the DL grants are allocated to the first slot of an adjacent PRB pair. That is, DL grants are allocated in a frequency-first mapping scheme.

Meanwhile, UL grants exist in the second slot of the PRB pair set as R-PDCCH resources. If one or more UL grants can be allocated to the second slot, a time-first mapping scheme is used. That is, if K UL grants can be allocated to the second slot and N UL grants are to be allocated (N>K), one UL grant is allocated to a starting part of the second slot of a given PRB pair and the second UL grant is allocated to the next time-domain position.

If K=2 as illustrated in FIG. 12, the third UL grant is allocated to a starting part of the second slot of the next (adjacent) PRB pair.

The above-described plurality of DL grants and UL grants may be control information transmitted to the same or different RNs.

Embodiment 2

R-PDCCH Mapping Rule for Second Slot

Unlike the first embodiment, especially when UL grants are allocated, the frequency-first mapping scheme may apply to the second slot. In this case, UL grants are mapped first to REs corresponding to specific subcarriers. If no more REs are available on the specific subcarriers, UL grants are allocated to REs of other subcarriers.

Figure 13:
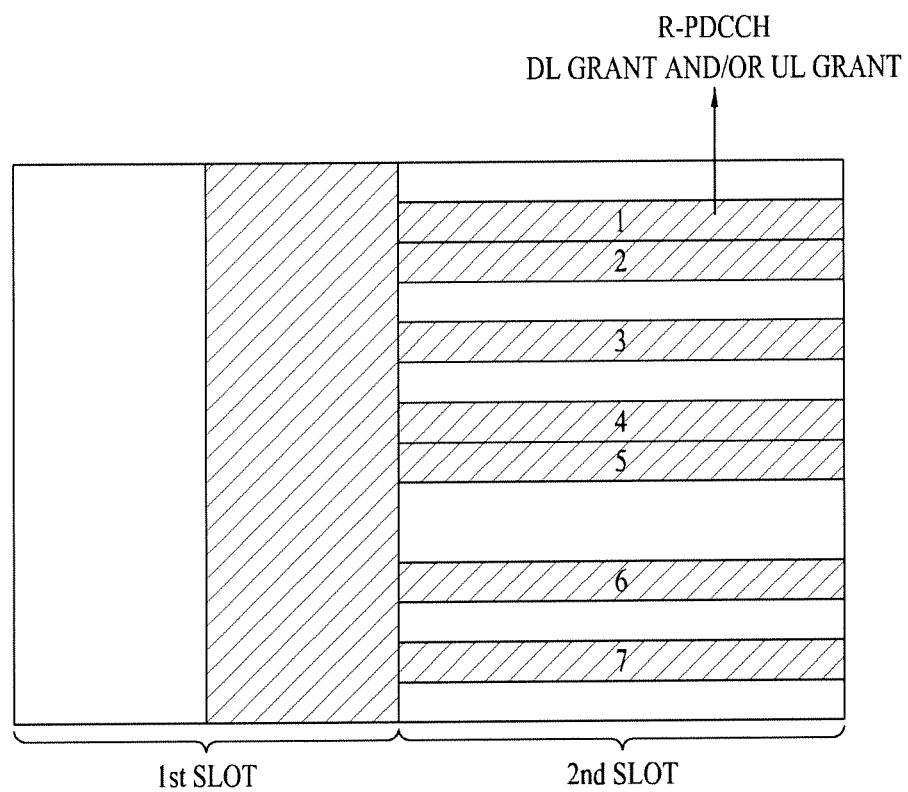
FIG. 13 illustrates a method for mapping an R-PDCCH in a second slot according to another embodiment of the present invention.

FIG. 13 illustrates a method for mapping an R-PDCCH in a second slot according to another embodiment of the present invention.

Referring to FIG. 13, UL grants of an R-PDCCH may be allocated to the first symbol of subcarrier 1, the first symbol of subcarrier 2, . . . , the first symbol of subcarrier 7, and then the second symbol of subcarrier 1, then the second symbol of subcarrier 2, in this manner.

This mapping method facilitates power sharing between an R-PDCCH RE area and a non-R-PDCCH RE area. Since each OFDM symbol has a uniform RE area power, a predetermined number of subcarriers in the same symbol are not used for an R-PDCCH, thereby enabling active power sharing, amplification, or balancing.

Embodiment 3

R-PDCCH Mapping Rule for Second Slot

In accordance with a third embodiment of the present invention, an R-CCE type and an R-CCE size are defined for an R-PDCCH.

Figures 14, 15:
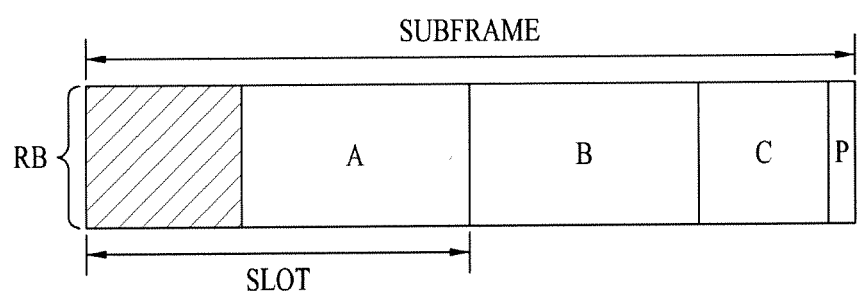
FIG. 14 is a view illustrating a third embodiment of the present invention.
FIG. 15 is another view illustrating the third embodiment of the present invention.

FIG. 14 illustrates the third embodiment of the present invention.

Referring to FIG. 14, the second slot has more available REs than the first slot in view of the nature of a backhaul subframe structure. If an R-CCE size is fixed and up to two R-CCEs can be included in the second slot, an R-PDCCH (a UL grant or a DL grant) allocated to the second slot has aggregation level 1 all the time. That is, UL grants or DL grants are transmitted in both R-CCEs of the second slot.

The third embodiment of the present invention is also applicable to the case where an R-CCE size is not fixed.

FIG. 15 is another view illustrating the third embodiment of the present invention.

Referring to FIG. 15, two types of grants having different R-CCE sizes (e.g. B and C+P) may be mapped to the second slot. If the second slot can be filled with grants having different R-CCE sizes, resource consumption can be minimized.

In this case, R-CCE sizes may be defined as follows.

First, when only two DM RS ports are used, R-CCE type #1 with a size of 38 REs is defined for the first slot and both R-CCE type #1 and R-CCE type #2 with a size of 28 REs are defined for the second slot. That is, two types, 38 REs and 28 REs may be defined.

Likewise, if two or more DM RS ports are used, R-CCE type #1 with 38 REs is defined for the first slot and both R-CCE type #1 and R-CCE type #2 with 28 REs are defined for the second slot.

The order of R-CCE types may be fixed, indicated by additional signaling, or determined implicitly through blind decoding. Herein, REs are secured for CSI-RSs through puncturing or rate matching.

It may also be contemplated that an R-CCE including REs of the first slot is defined as R-CCE type #1 and an R-CCE including REs of the second slot is defined as R-CCE type #2. For example, R-CCE type #1 with 38 REs and R-CCE type #2 with 66 REs, or R-CCE type #1 with 32 REs and R-CCE type #2 with 60 REs may be defined.

The above example is for a normal Cyclic Prefix (CP) case. Obviously, specific values may be changed in an extended CP case.

As described before, allocation of two different types of grants may be considered, when R-CCE sizes are not fixed. Or allocation of the same type of grants for different RNs may be considered.

If an RE area P remains according to an R-CCE size setting, the RE area P is not used or used for CSI-RS transmission in the third embodiment of the present invention. The latter case advantageously affects R-PDCCHs less than securing REs for CSI-RSs through puncturing or rate matching.

Embodiment 4

Method for Defining R-CCE Sizes when Different REs are Configured for DM-RSs in First and Second Slots In accordance with a fourth embodiment of the present invention, different numbers of DM RS ports and different numbers of required REs are set for the first and second slots.

Preferably, the first slot is designed in such a manner that an R-PDCCH (i.e. a DL grant) can be demodulated stably irrespective of a change in the number of DM RS ports. For this purpose, on the assumption of a maximum number of DM RS ports, a maximum number of REs are configured for DM RSs and R-PDCCHs are transmitted only in REs except for the REs of the DM RSs.

However, the situation is different for the second slot. Data or control information may be transmitted in the second slot. Or no signal may be transmitted in the second slot. If data is transmitted in the second slot, information about the number of DM RS ports or information about REs occupied by DM RSs may be acquired by a DL grant in the first slot and the data may be demodulated and decoded based on the acquired information. Therefore, if data is transmitted in the second slot, RE consumption caused by setting a maximum number of REs for DM-RSs can be avoided.

On the other hand, R-CCEs may be defined on the assumption that only 6 DM RS REs carrying control information (i.e. a UL grant or a DL grant) are occupied in the second slot. In this case, 66 REs are available in the second slot. If an R-CCE size is 32 REs, two R-CCEs may exist in the second slot. Therefore, if the first and second slots are configured so as to have 12 DM RS REs and 6 DM RS REs at maximum, respectively, it is possible to fix an R-CCE size to 32 REs. That is, as far as control information exists in all of a PRB pair, R-CCEs of the same size, preferably 32 REs may be set uniformly in every slot.

[Table 2] below lists numbers of available REs according to numbers of DM RS REs.

TABLE 2

|  | Total | Available |  |
|---|---|---|---|
| $1^{st}$ slot | 48 | 38 | 6 DMRS case |
| $2^{nd}$ slot | 84 | 66 |  |
| $1^{st}$ slot | 48 | 32 | 12 DMRS case |
| $2^{nd}$ slot | 84 | 60 |  |
| $1^{st}$ slot | 48 | 32 | 12 DMRS case |
| $2^{nd}$ slot | 84 | 66 | 6 DMRS case |

In [Table 2], the numbers of available REs in the first and second slots reveal that one R-CCE with a size indicated in [Table 2] is allocated to the first slot and two R-CCEs with a half of the indicated size are allocated to the second slot. In this case, REs which are not allocated as R-CCEs among total REs are preferably used for CSI-RE transmission in order to minimize resource consumption and the influence of CSI-RE puncturing.

Figure 16:
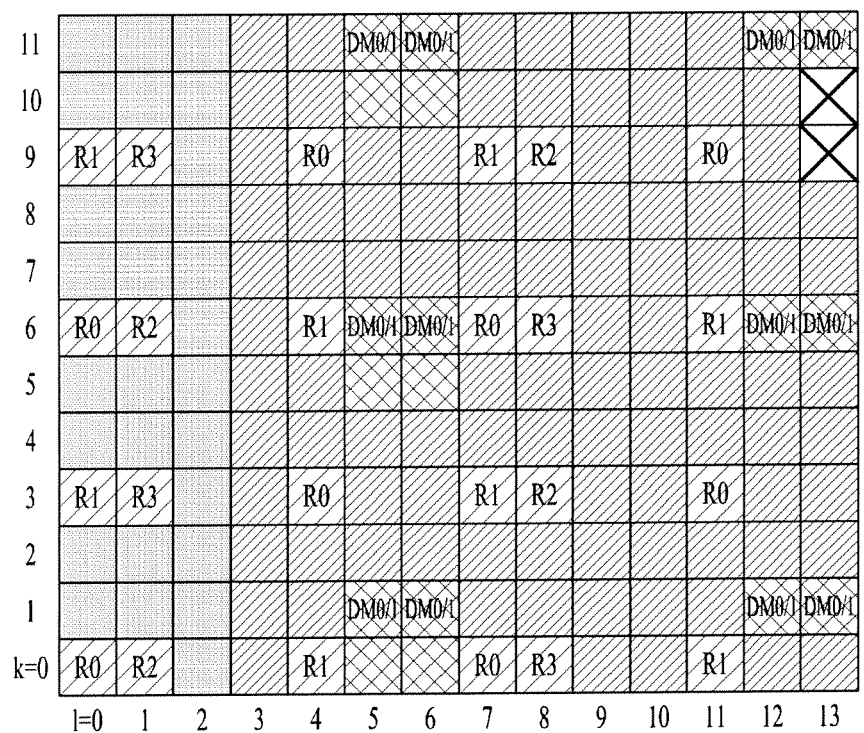
FIGS. 16, 17 and 18 illustrate R-PDCCH allocation according to a fourth embodiment of the present invention.
Figure 17:
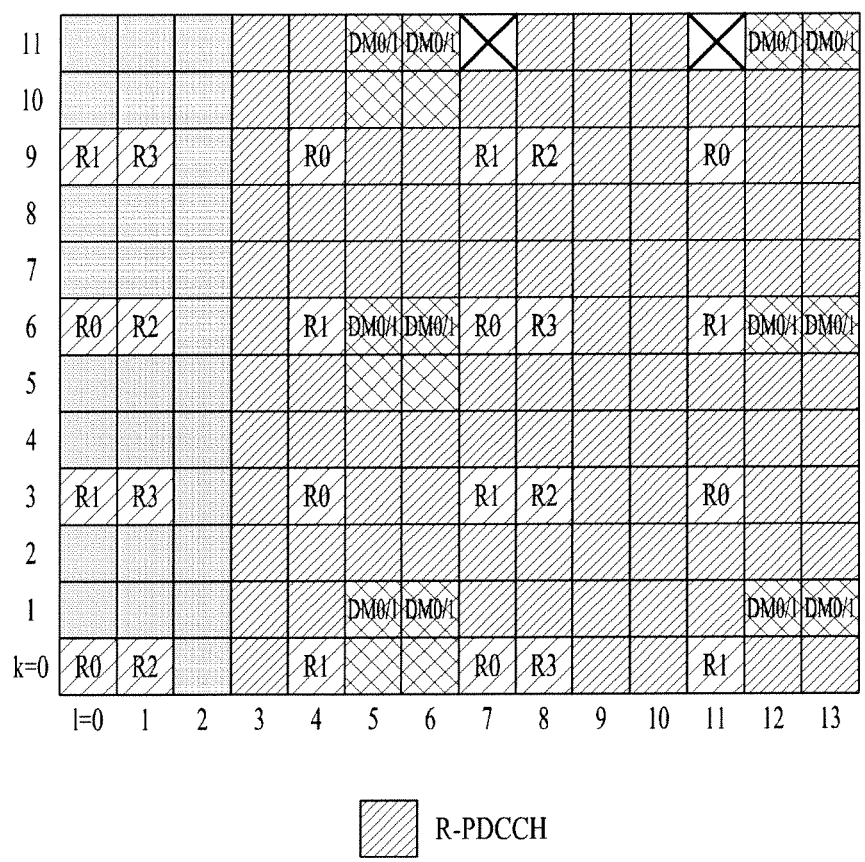
Figure 18:
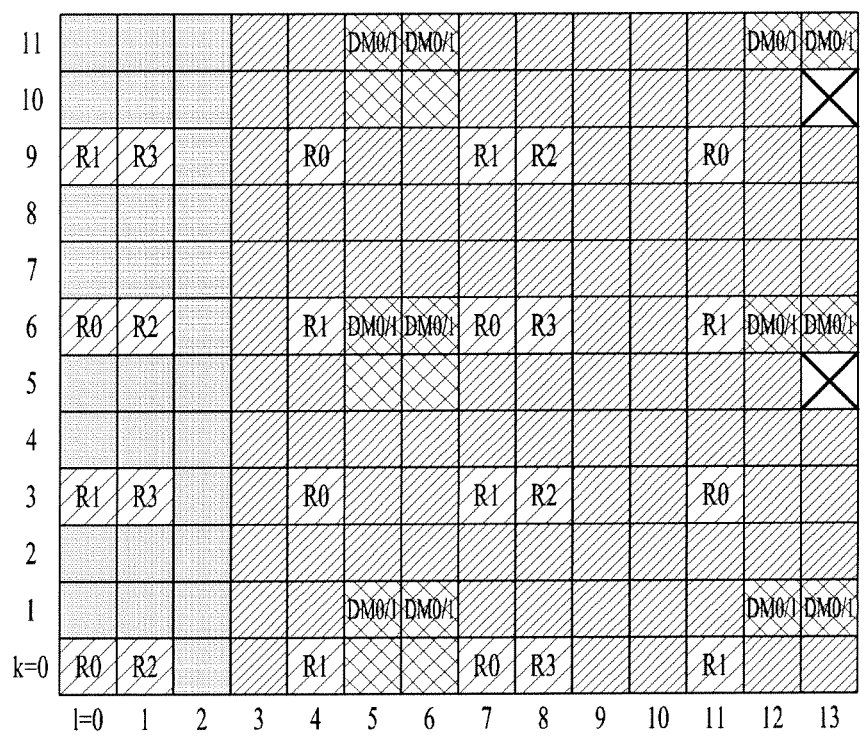

FIGS. 16, 17 and 18 illustrate R-PDCCH allocation according to the fourth embodiment of the present invention. Particularly, the positions of remaining REs excluded from allocation as R-CCEs are different in FIGS. 16, 17 and 18.

In FIG. 17, the remaining REs are arranged in symbols having CRS R0 and CRS R1 to control CRS transmission power more flexibly.

In FIG. 18, if R-CCEs are defined in units of a subcarrier, one RE remains in each of two R-CCEs. Even though R-CCEs are not defined in units of a subcarrier, symmetrical arrangement of remaining REs as illustrated in FIG. 18 may facilitate interleaver design.

Embodiment 5

Method for Defining R-CCE Size in the Presence of Only CRSs

Figure 19:
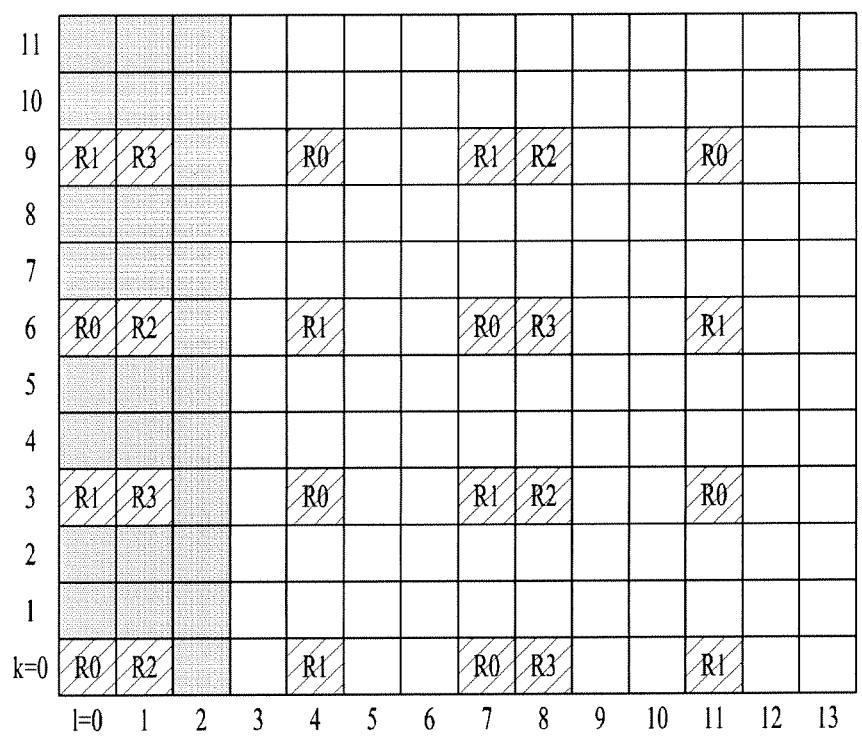
FIG. 19 illustrates a fifth embodiment of the present invention.

FIG. 19 illustrates a fifth embodiment of the present invention. Particularly, FIG. 19 illustrates a subframe with CRSs only. In this case, 44 REs are available for R-PDCCH or R-PDSCH transmission in the first slot and 72 REs are available for R-PDCCH or R-PDSCH transmission in the second slot. If an R-CCE size is fixed and only one R-CCE size is used, only 36-RE R-CCEs are available.

Or available REs of the first slot are defined as R-CCE type #1 and available REs of the second slot are defined as R-CCE type #2, as described before. That is, two R-CCE types are defined.

In addition, R-CCE sizes and types suitable for DM RS-based and/or CRS-based transmission may be indicated by additional signaling in the fourth and fifth embodiments.

Embodiment 6

Method for Decoding R-PDCCH and R-PDSCH

A sixth embodiment of the present invention provides an R-PDCCH decoding method.

In the present invention, an R-PDSCH is decoded on the assumption that an R-PDCCH exists in the first slot of resources (RBs) in which the R-PDCCH is detected during R-PDCCH decoding. That is, it is assumed that the R-PDSCH is transmitted only in the second slot of the corresponding RBs and R-PDSCHs are transmitted also in the first slot of other RBs.

Although the corresponding RN has no knowledge of RBs used for R-PDCCHs transmitted to other RNs, this shortcoming may be overcome, if a scheduler operates such that an RN to which the second slot of specific RBs is allocated as an R-PDSCH is restricted to one of RNs to which R-PDCCHs are partially transmitted in the first slot of the corresponding RBs and an RB area other than RBs carrying a part of an R-PDCCH for the corresponding RN does not include R-PDCCHs transmitted to other RNs.

Figure 20:
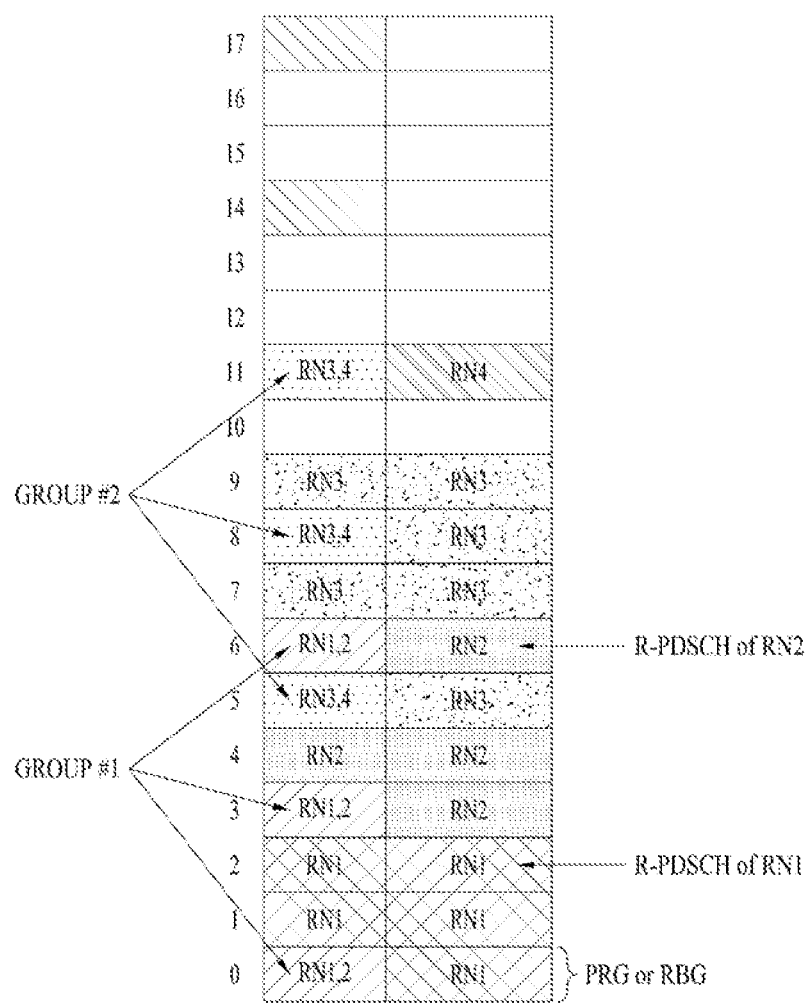
FIG. 20 illustrates a sixth embodiment of the present invention.

FIG. 20 illustrates a sixth embodiment of the present invention.

Referring to FIG. 20, it is assumed that a total of PRBs are available, PRBs #0, 3, 5, 6, 8, 11, 14 and 17 form an entire search space, and R-PDCCHs are transmitted only in PRBs #0, 3, 5, 6, 8, and 11. It is also assumed that RN1 and RN2 belong to RN group #1 and are jointly interleaved and RN3 and RN4 belong to RN group #2 and are jointly interleaved.

In this case, RN1 and RN2 are set to perform blind decoding in a PRB area including PRBs #0, 3 and 6 and RN3 and RN4 are set to perform blind decoding in a PRB area including PRBs #5, 8 and 11. These PRB areas may be set by RN-specific signaling.

It is assumed that RN1 and RN2 know that an R-PDCCH for RN1 or RN2 exists in the first slot of PRBs #0, 3 and 6. Thus, RN1 and RN2 may successfully decode R-PDSCHs in the second slot of the corresponding subframe and in other PRBs. Meanwhile, if RN1 and RN2 know even PRBs #5, 8, and 11 carrying R-PDCCHs for RN3 and RN4, RN1 and RN2 decode data only in the second slot, determining that a first R-PDCCH exists in the first slot of PRBs #5, 8 and 11 as well as PRBs #0, 3 and 6. It is assumed that R-PDSCHs for RN1 and RN2 may be transmitted in PRBs #10, 12, 13, 14, 15, 16 and 17, starting from the first slot.

To allow RN1 and RN2 to determine PRBs without R-PDSCHs in the first slot, an eNB may signal PRBs carrying R-PDCCHs for group #1 to which RN1 and RN2 belong and PRBs carrying R-PDCCHs for group #2 to which RN3 and RN4 belong.

In addition, the scheduler should perform a control operation such that an R-PDSCH for an RN of group #1 is not allocated to a PRB carrying an R-PDCCH for an RN of group #2 and R-PDSCHs are transmitted, starting from the first slot in other PRBs than PRBs in which R-PDCCHs are transmitted to RNs of group #1 and group #2. Thus, an RN decodes an R-PDSCH, beginning with the first slot in the absence of an R-PDCCH and does not attempt R-PDSCH decoding in the first slot of PRBs carrying R-PDCCHs of the two groups.

Meanwhile, an RN of group #1 may transmit an R-PDSCH in the R-PDCCH area of group #2. For this purpose, the eNB should schedule so that an R-PDSCH for an RN of group #1 is not overlapped with an R-PDCCH for an RN of group #2.

It may also be contemplated that PRBs carrying an actual R-PDCCH are explicitly signaled to each RN. Needless to say, it suffices to indicate, to each RN, RBs carry R-PDCCHs in the first slot among RBs carrying R-PDSCHs to RNs. However, since the number of PRBs carrying actual R-PDCCHs is variable, a signaling format indicating the PRBs is also variable.

Embodiment 7

Method for Blind Decoding of R-PDCCH

RBs carrying an R-PDCCH may be indicated by semi-static RRC signaling. An R-PDCCH for a specific RN may be transmitted in a part of indicated RBs. That is, after M RBs are set as an R-PDCCH candidate set, an R-PDCCH is transmitted using a subset of N RBs (M>=N). A different subset is allocated to each RN and the RN blind-decodes an R-PDCCH in the allocated subset. However, since one RN does not know the position of an R-PDCCH transmitted to another RN, data, that is, an R-PDSCH is transmitted in an area other than all positions of the afore-described candidate set. In addition, full interleaving and partial interleaving are applicable for R-PDCCH transmission. Full interleaving refers to interleaving R-PDCCHs transmitted to all RNs on an interleaving unit basis and then mapping the interleaved R-PDCCHs to PRBs. Partial interleaving refers to interleaving R-PDCCHs for some RNs like an RN group of Embodiment 6 and mapping the interleaved R-PDCCHs to PRBs.

However, it may occur that an R-PDCCH for a specific RN is not uniformly mapped to RBs configured for R-PDCCHs allocated to a total bandwidth or a partial bandwidth, after interleaving. Given an interleaving unit of 4 REs, an R-PDCCH composed of 36 REs may be uniformly mapped across 9 RBs (4 REs/RB). If 9 or more RBs are mapped, a specific RB in an R-PDCCH subset may not include a part (i.e. 4 REs) of an R-PDCCH for a corresponding RN. In this case, even though an R-PDCCH area does not include an R-PDCCH, an R-PDSCH cannot be transmitted in the R-PDCCH area, like an RB including an R-PDCCH. That is, a specific RB of the corresponding R-PDCCH subset is not available to R-PDSCH transmission, for any RN of an RN group subjected to joint interleaving.

To avert the above problem, it is proposed that the actual bandwidth (i.e. the number of RBs) of an R-PDCCH is determined according to the amount of the R-PDCCH and a smallest interleaving unit covering the value is selected. Preferably, an interleaving unit is set to a multiple of a minimum interleaving unit to reduce the number of later-described blind decodings. An RN performs blind decoding, beginning with the basic bandwidth of blind decoding and increases the bandwidth until detecting an R-PDCCH. The interleaving unit is variable and may be set by concatenating basic interleaving units.

Figure 21:
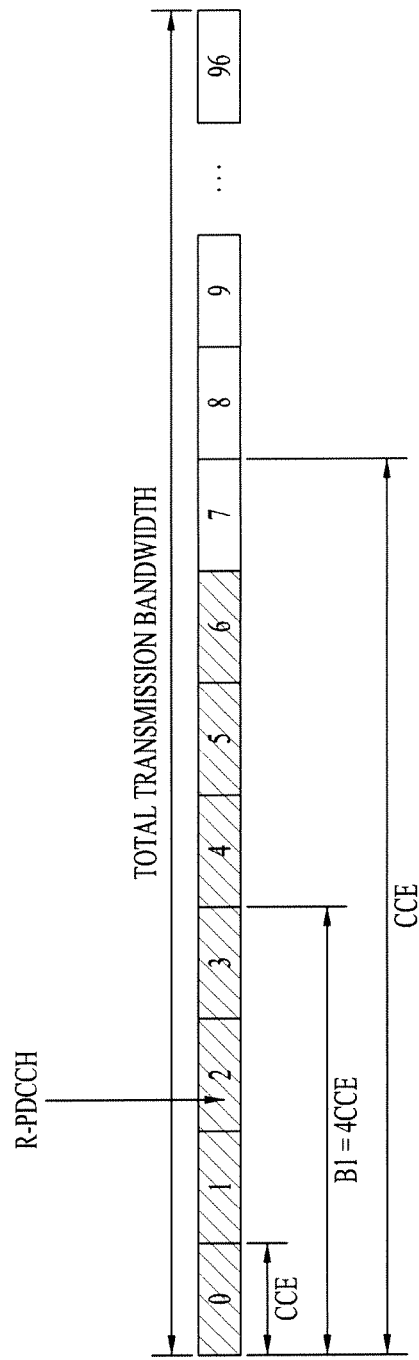
FIG. 21 illustrates a blind decoding method according to a seventh embodiment of the present invention.

FIG. 21 illustrates a blind decoding method according to a seventh embodiment of the present invention.

If 4 R-PDCCHs having 1 RB size respectively are to be transmitted to each of 4 RNs, the 4 R-PDCCHs are interleaved and mapped to 4 RBs. Obviously, four continuative R-PDCCH indexes are used, their PRB indexes are apart from one another uniformly, and the 4 R-PDCCHs are transmitted using 4 RBs. If a total of 7 R-PDCCHs are transmitted to each of 7 RNs, a smallest interleaving unit covering the value may be 8 RBs.

The specific value of the interleaving unit may be set to a multiple of a minimum interleaving unit implicitly, rather than it is signaled to an RN. Therefore, the RN first performs blind decoding on the basis of the minimum interleaving unit, in units of 4 RBs. If an R-PDCCH is not detected, the RN then performs blind decoding in units of 8 RBs.

Figure 22:
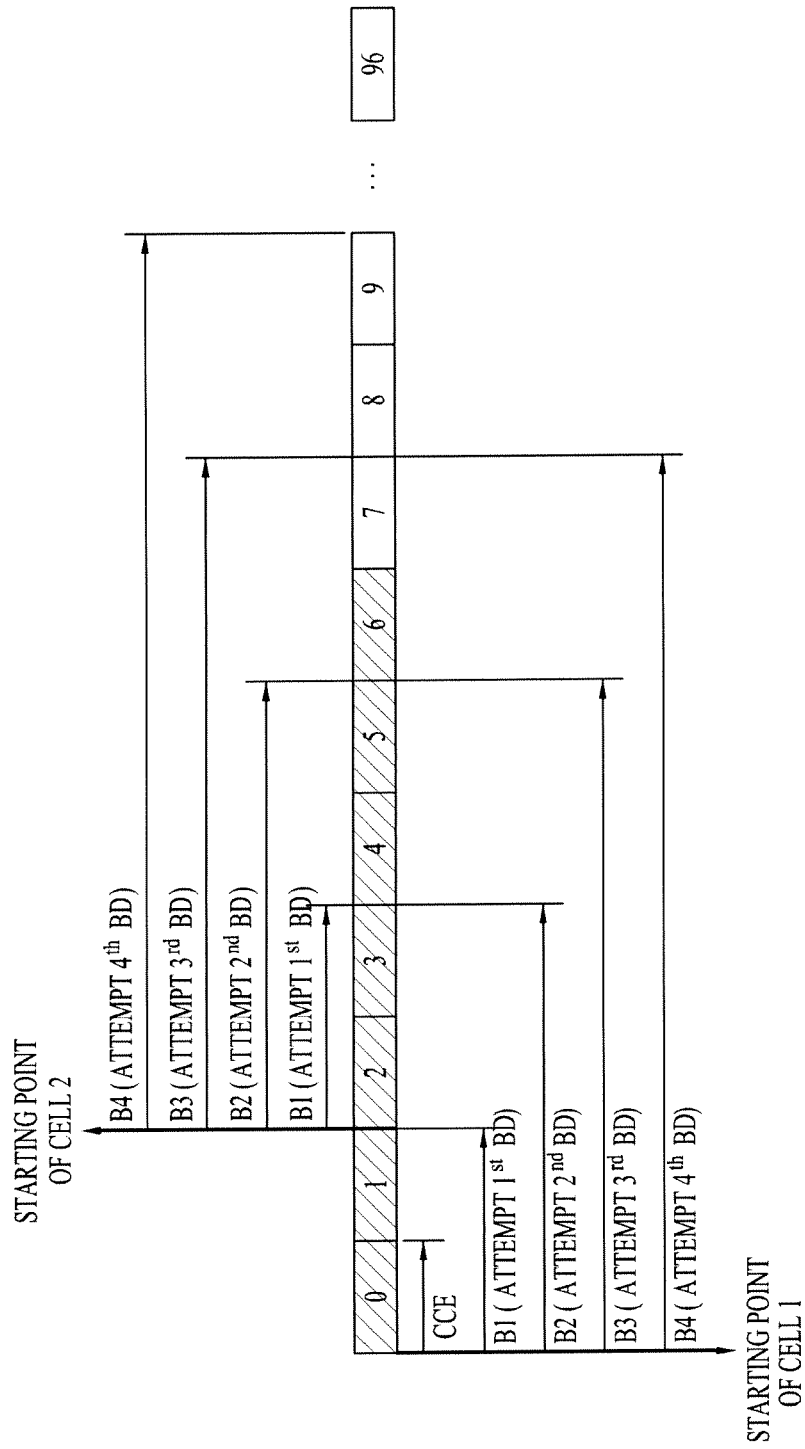
FIG. 22 illustrates a multi-level blind decoding method according to the seventh embodiment of the present invention.

FIG. 22 illustrates a multi-level blind decoding method according to the seventh embodiment of the present invention.

As described before, a blind decoding bandwidth is increased until blind decoding is successful in FIG. 22. Meanwhile, the starting point of blind decoding may be different for each cell in order to further mitigate interference in addition to interleaving-based interference control.

The starting points of blind decoding and blind decoding steps Bi (i=1, 2, 3, . . . ) illustrated in FIG. 22 are exemplary and thus may vary. In case of a 3-cell configuration, a system bandwidth/3 may be set as an offset. While the Bi value is shown as increased only in one direction from a starting point, it may be increased in both directions from the starting point.

Especially when interleaving is not performed, inter-cell interference can be minimized by changing the starting point using an offset in this manner.

Aside from setting different blind decoding starting points for cells, different offsets may be set for different cells, for interleaving. This means that a different interleaving result is achieved according to a cell ID or a cell-specific value.

Figure 23:
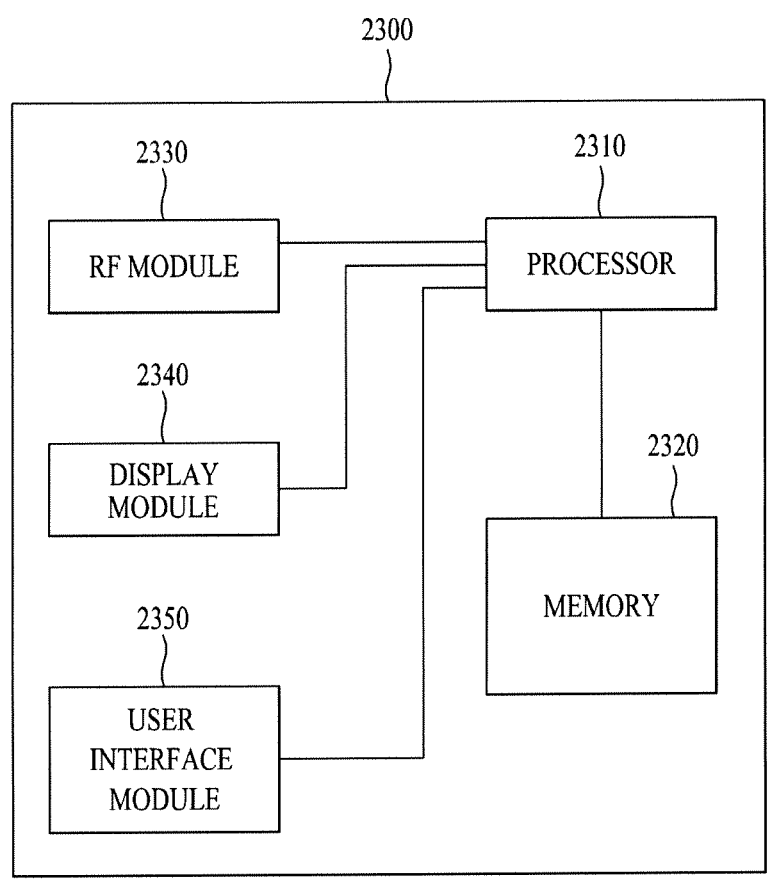
FIG. 23 is a block diagram of a communication apparatus according to an embodiment of the present invention.

FIG. 23 is a block diagram of a communication apparatus according to an embodiment of the present invention.

Referring to FIG. 23, a communication apparatus 2300 includes a processor 2310, a memory 2320, a Radio Frequency (RF) module 2330, a display module 2340, and a user interface module 2350.

For the convenience's sake of description, the communication apparatus 2300 is shown as including the components illustrated in FIG. 23. Thus, some modules may be omitted from or added to the communication apparatus 2300, when needed. In addition, a module in the communication apparatus 2300 may be configured into separate modules. The processor 2310 is configured to perform operations according to the embodiments of the present invention described before with reference to FIGS. 1 to 22.

The memory 2320 is connected to the processor 2310 and stores an Operating System (OS), applications, program code, and data. The RF module 2330 is connected to the processor 2310 and functions to convert a baseband signal to an RF signal or an RF signal to a baseband signal. For this purpose, the RF module 2330 performs analog conversion, amplification, filtering, and frequency upconversion, or performs these operations reversely. The display module 2340 is connected to the processor 2310 and displays various types of information. The display module 2340 may be configured with, but not limited to, known components such as a Liquid Crystal Display (LCD), a Light Emitting Diode LED), and an Organic Light Emitting Diode (OLED). The user interface module 2350 is connected to the processor 2310 and may be configured using known user interfaces such as a keypad, a touch screen, etc. in combination.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term, fixed station, Node B, eNode B (eNB), access point, etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting and receiving a signal between an eNB and an RN in a wireless communication system have been described in the context of a 3GPP LTE system, they are applicable to other various wireless communication systems.

The invention claimed is:

1. A method for receiving control information from a Base Station (BS) at a Relay Node (RN) in a wireless communication system, the method comprising:
receiving a downlink signal from the BS;
receiving an offset for blind decoding from the BS; and
detecting control information for the RN by blind decoding of a blind decoding bandwidth indicated by the downlink signal based on a minimum interleaving size unit,
wherein the minimum interleaving size unit is signaled from the BS,
wherein a starting point of blind decoding in the blind decoding bandwidth is determined by the offset,
wherein the offset is determined by dividing a system bandwidth by number of cells related with the RN, and is set to different each other between the cells related with the RN, and
wherein the blind decoding bandwidth is configured to being increased by the minimum interleaving size unit according to a blinding decoding step value until the blind decoding is successful.

2. The method according to claim 1, wherein the downlink signal is interleaved control information for a plurality of RNs.

3. A Relay Node (RN) configured to receive control information from a Base Station (BS), the RN comprising:
a receiver; and
a processor operatively connected to the receiver and configured to:
  receive a downlink signal from the BS;
  receive an offset for blind decoding from the BS; and
  detect control information for the RN by blind decoding of a blind decoding bandwidth indicated by the downlink signal based on a minimum interleaving size unit,
  wherein the minimum interleaving size unit is signaled from the BS,
  wherein a starting point of blind decoding in the blind decoding bandwidth is determined by the offset,
  wherein the offset is determined by dividing a system bandwidth by number of cells related with the RN, and is set to different each other between the cells related with the RN, and
  wherein the blind decoding bandwidth is configured to being increased by the minimum interleaving size unit according to a blinding decoding step value until the blind decoding is successful.

* * * * *